US006745266B1

(12) United States Patent
Johnson et al.

(10) Patent No.: US 6,745,266 B1
(45) Date of Patent: Jun. 1, 2004

(54) METHOD AND APPARATUS FOR DISK CACHE TRANSLATION BETWEEN SYSTEMS

(75) Inventors: Craig B. Johnson, Shoreview, MN (US); Dennis R. Konrad, Welch, MN (US); Michael C. Otto, Stillwater, MN (US)

(73) Assignee: Unisys Corporation, Blue Bell, PA (US)

( * ) Notice: Subject to any disclaimer, the term of this patent is extended or adjusted under 35 U.S.C. 154(b) by 204 days.

(21) Appl. No.: 10/027,069

(22) Filed: Dec. 21, 2001

(51) Int. Cl.[7] .................................................. G06F 3/00
(52) U.S. Cl. ............................ 710/65; 710/30; 710/54; 710/74; 709/246; 711/112; 711/202
(58) Field of Search ....................... 710/31, 35, 36, 710/42, 52, 30, 54, 65, 66, 112, 39, 74; 712/30; 709/246; 711/100, 112, 113, 118, 171, 202

(56) References Cited

U.S. PATENT DOCUMENTS

| 4,315,312 A | * | 2/1982 | Schmidt ...................... 364/200 |
|---|---|---|---|
| 5,446,861 A | * | 8/1995 | Idleman et al. .............. 395/427 |
| 5,651,002 A | * | 7/1997 | Van Seters et al. .......... 370/392 |
| 5,742,789 A | * | 4/1998 | Ofer et al. ................... 395/438 |
| 5,761,656 A | * | 6/1998 | Ben-Shachar .................. 707/4 |
| 5,832,236 A | * | 11/1998 | Lee ............................ 709/249 |
| 6,591,349 B1 | * | 7/2003 | Steinman et al. ........... 711/154 |

\* cited by examiner

Primary Examiner—Rehana Perveen
Assistant Examiner—Rijue Mai
(74) Attorney, Agent, or Firm—Charles A. Johnson; Mark T. Starr; Crawford Maunu, PLLC

(57) ABSTRACT

A disk cache translation system for mapping data record lengths between systems having different data record lengths. Command queue (315) maps into initiation queue (305) to allow I/O manager (230) to manage I/O requests from operating system (125). I/O requests are statused by I/O manager (230) using status queue (325). Store-thru cache (280) provides a single interface to disk array (270) such that disk array write operations are reported complete only when user memory (250), I/O cache (280) and disk array (270) are synchronized. Data record length translations are performed using I/O cache (280) in order to align data record length differences between operating system (125) and I/O device (270).

24 Claims, 5 Drawing Sheets

METHOD AND APPARATUS FOR DISK CACHE TRANSLATION BETWEEN SYSTEMS

FIELD OF THE INVENTION

This invention relates generally to format translation between systems, and more particularly, to utilization of disk cache to perform the format translations between differing systems.

BACKGROUND OF THE INVENTION

Today's computing systems have seen several decades of evolution. Evolution which has transformed one-of-a-kind, custom built machines into common, everyday appliances found in most homes today. Central processing units (CPU), which were the size of refrigerators, requiring many kilowatts (kW) of power and associated cooling, have been reduced to printed circuit board (PCB) implementations, which have proliferated the computing industry. The relatively few peripherals operated in combination with the early CPUs including tape readers, teletypes, line printers, etc., were tightly coupled to the early CPUs, which yielded highly customized computing solutions.

The integrated circuit (IC) is largely, if not wholly, responsible for the drastic reduction in the size and power requirements of the early computing solutions. In addition, the IC is largely responsible for the exponential increase in the computational capabilities of the modern day desktop computer. Through the development of the IC, not only has the CPU been reduced to printed circuit board implementations, but so have peripherals such as Random Access Memory (RAM), high resolution graphics, full motion video drivers and high bandwidth networking cards, to name only a few. Each of the peripheral applications implemented on PCB's share a common communication architecture with the CPU called the computer bus.

The computer bus allows communication between an Operating System (OS) executing on the CPU, or processor, and its peripherals. The computer bus is generally separated into several functional groups such as address, data and control. The address group of the computer bus identifies the specific peripheral attached to the computer bus as well as a particular component contained within the peripheral, such as a register or memory location. The data group of the computer bus defines the information transferred to or received from the peripheral. The control group of the computer bus defines the method or protocol used to effect data or control transfers on the computer bus. The address and control groups associated with the computer generally having a fixed number of binary units, or bits, associated with each group.

The Peripheral Component Interconnect (PCI) bus has been developed to provide coherence and standardization, improving upon the limitations of the PCI predecessors, such as Industry Standard Architecture (ISA) and the Video Electronics Standards Association Local (VL) bus. The PCI bus specification first appeared in 1992, with subsequent revisions published in 1993, 1995 and 1999. The PCI bus specification provides several features, which potentially allows PCI implementations to accommodate computer architectures for many years to come.

The PCI bus architecture facilitates peripherals, such as tape drive controllers and disk drive controllers, to be utilized by an OS executing on a CPU device. One advantage of the PCI bus is that the PCI bus allows a divergence between the PCI bus peripheral device architecture and the OS, such that the PCI peripheral device architecture has no particular correlation to the OS architecture or CPU structure.

One particular divergence between the PCI peripheral device and the OS, for example, may be the difference in minimum lengths of data records that are allowable between the OS and the PCI peripheral device. Such is the case, for example, for an OS that is operating in conjunction with a Small Computer System Interface (SCSI) hard disk that requires a minimum of one disk record, or 512 bytes for example, for each read or write operation to the SCSI hard disk. Some SCSI hard disk operations, however, only require updates to a portion of the disk record and not the entire 512-byte record.

Prior art solutions to adapt the SCSI hard disk to the OS require custom hardware channels and software drivers to match the particular SCSI hard disk access requirements to the OS in use. Data updates to the SCSI hard disk that are less than one record in length, for example, requires the prior art drivers to first read an entire record of data from the SCSI hard disk in the appropriate format. Once read, the appropriate bits within the data record are updated and finally written back to the SCSI hard disk. The prior art solution, however, departs from the essence of one of the PCI bus advantages because custom hardware and software is required of the prior art solution, in order to provide an operable interface to the SCSI PCI peripheral.

It can be seen, therefore, that there is a need for a method and apparatus to provide an operable interface between a PCI peripheral device and an OS performing Input/Output (I/O) operations using the PCI bus, without the need for custom hardware channels and software drivers.

SUMMARY OF THE INVENTION

The present invention relates to a method and apparatus for disk cache translation between a computer system and an external system.

In accordance with one embodiment of the invention, a computer system having an operating system defining the operation of the computer system that includes a first memory device containing the operating system. The operating system defines a logical interface, which includes a first queue that receives requests from the operating system, a second queue that statuses the requests received from the operating system, and a memory storage area provided for user data storage. The computer system further includes a second memory device coupled to the memory storage area to modify the user data, such that the data block size is configurable by the computer system.

In accordance with more specific embodiments of the computer system, the second memory device is operative to provide bi-directional data processing between an external device and the memory storage area and configured to optionally modify the user data received from the memory storage area through a pad translation. The second memory device is also configured to optionally modify data received from the external device through a strip translation.

In accordance with another embodiment of the invention, an article of manufacture is provided that contains a program storage medium readable by a computer. The medium tangibly embodies one or more programs of instructions executable by the computer to perform a method of operating a computer system. The method receives requests from the computer system to transfer data blocks between the computer system and an external system, allows a configurable size for the data blocks, and translates the size of the data blocks exchanged between the computer system and the external system, such that the size of the data blocks after translation align with each other.

In accordance with more specific embodiments of the method of operating the computer system, the received requests are queued in an initiation queue and managed by an I/O manager. The I/O manager statuses the received requests in a status queue. The data block size includes optionally padding the data blocks to a size compatible with a size required by the external system and optionally stripping the data blocks to a size compatible with a size required by the computer system.

In accordance with another embodiment of the invention, a method of operating a computer system is presented to receive requests from the computer system to transfer data blocks between the computer system and an external system, allowing a configurable size for the data blocks, and translating the size of the data blocks exchanged between the computer system and the external system, such that the size of the data blocks after translation align with each other.

The received requests are queued in an initiation queue and managed by an I/O manager, as well as statused by the I/O manager in a status queue. Translating the size of the data blocks received from the computer system includes optionally padding the data blocks to a size compatible with a size required by the external system and stripping the data blocks received from the external system to a size compatible with a size required by the computer system.

In accordance with one embodiment of the invention, a computer system including a first memory means containing the operating system is provided. The operating system defines a logical interface, that includes a first queuing means coupled to receive requests from the operating system, a second queuing means coupled to status the requests received from the operating system, and a memory storage means coupled to provide storage for user data. The computer system further includes a second memory means coupled to the memory storage means to modify the user data, such that a block size of the user data is configurable by the computer system.

In accordance with more specific embodiments of the computer system, the second memory means is operative to provide bi-directional data processing between an external device and the memory storage means. The second memory means is configured to optionally modify the user data received from the memory storage means through a pad translation. The second memory means is also configured to optionally modify data received from the external device through a strip translation.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

In the following description of the various embodiments, reference is made to the accompanying drawings, which form a part hereof, and in which is shown by way of illustration various embodiments in which the invention may be practiced. It is to be understood that other embodiments may be utilized, and structural and functional modifications may be made without departing from the scope of the present invention.

Generally, the present invention is directed to a method and apparatus to allow the connection of a generic PCI peripheral device to an established computing system, running a customized OS. The method and apparatus are operative to reduce the cost of the integration, since no custom hardware is utilized. A disk cache acts as the translation device between the PCI peripheral device and the customized operating system through the use of software drivers and channels.

Figure 1:
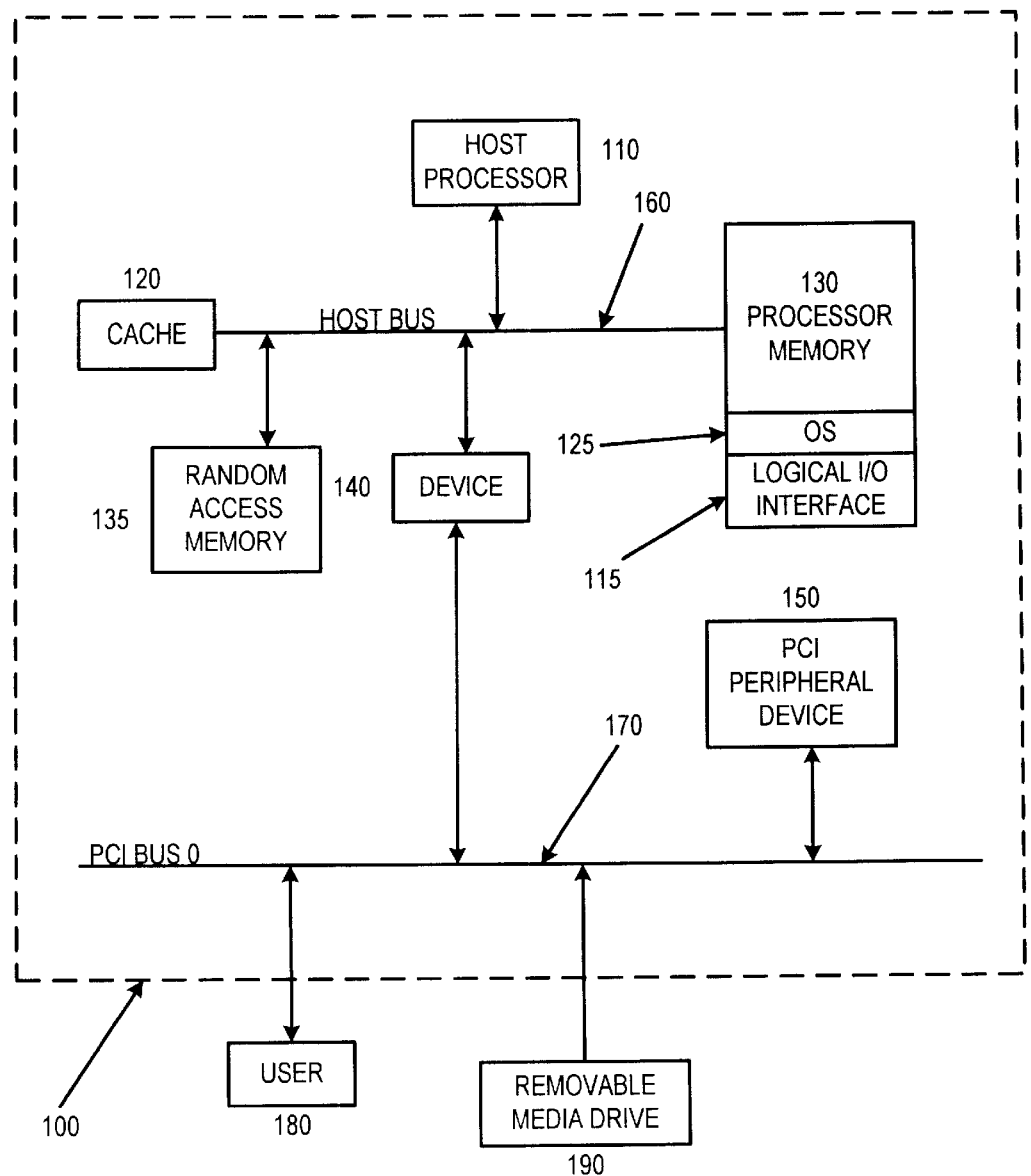
FIG. 1 illustrates block diagram of a computing system.

FIG. 1 illustrates a block diagram of an exemplary computing system 100 using a bridge hierarchy to accommodate PCI bus interconnection of host processor 110 and PCI peripheral device 150. PCI peripheral device 150 is connected to PCI bus 0 170 and communicates with host processor 110 through device 140. Host processor 110 utilizes cache 120 and processor memory 130 for memory operations via host bus 160. Device 140 implements the required bridges, memory controllers, interrupt controllers, bus arbiters, etc. for proper PCI bus communication management. PCI device 150 may include, for example, a SCSI tape drive or a SCSI hard disk drive. User 180 maintains access to computing system 100 through the use of typical I/O devices (not shown) such as a video monitor, keyboard and mouse, which may interconnect through PCI bus 0 170. User 180 maintains access to Random Access Memory (RAM) 135 as required to support computing functions and read/write operations to disk array 270. An operating system executes within processor memory 130 in conjunction with host processor 110 to define the operation of computing system 100. Removable media drive 190 is effective to accommodate any type of removable media such as floppy disks, Compact Disks (CD), tape drives, etc. so that a computer program (not shown) may be loaded into processor memory 130 and executed by host processor 110, to configure computing system 100 for execution. The computer program (not shown) comprises instructions which, when read and executed by host processor 110, causes computing system 100 to perform the steps necessary to execute the steps or elements according to the present invention.

In order to initiate I/O requests to PCI peripheral device 150, the operating system residing within processor memory 130 contains an I/O application program to perform the I/O functions issued by the operating system. The I/O interface maintained by the I/O application program is logical I/O interface 115 of operating system 125, such that I/O requests from operating system 125 contain information on the type of request, the device being requested, number of words to transfer, etc. The I/O application program contains the logic to process the request and to build the appropriate channel type (e.g. SCSI or Fiber) as required by the particular device being accessed.

Figure 2:
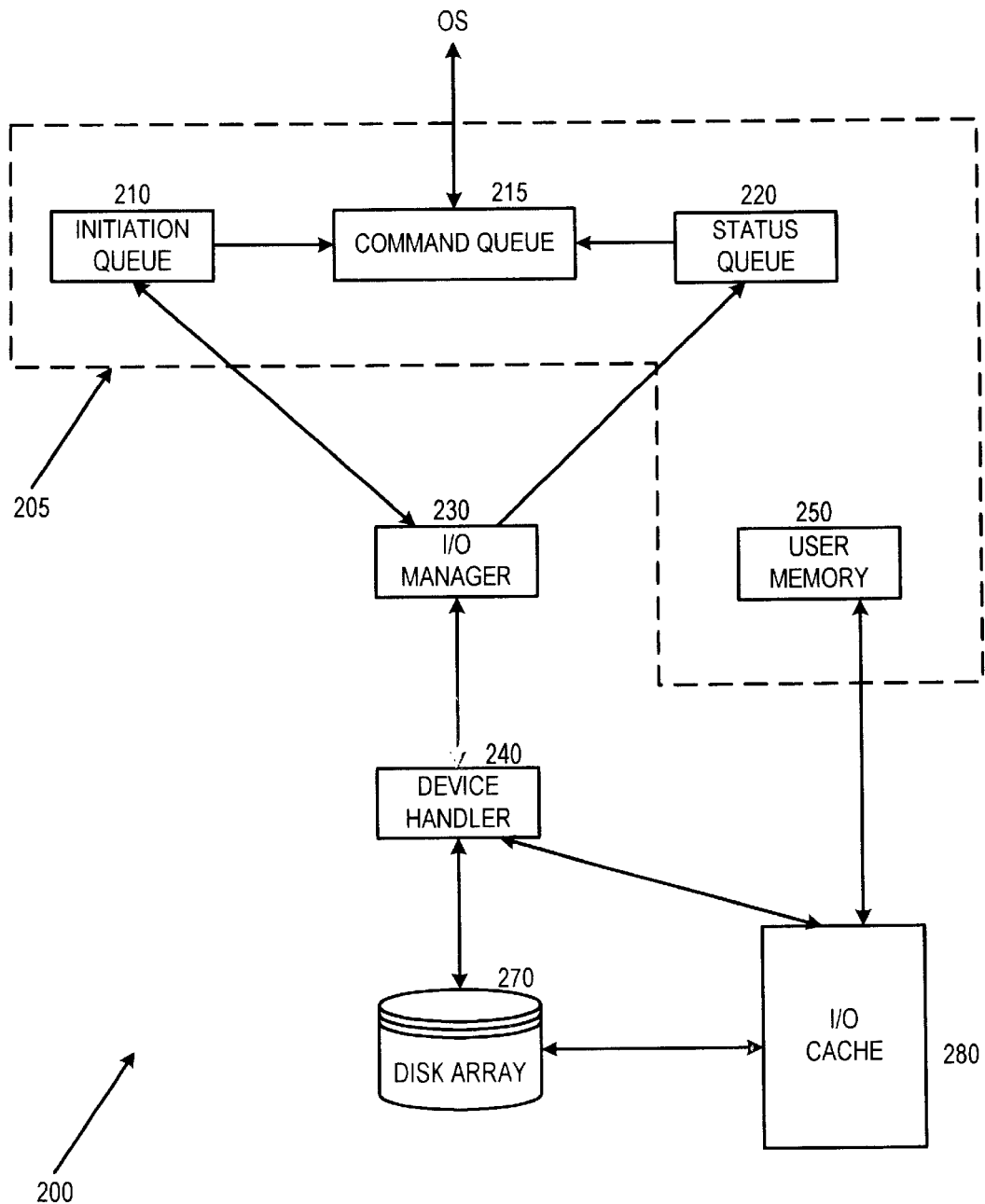
FIG. 2 illustrates a control and data flow diagram.

FIG. 2 illustrates control and data flow diagram 200 according to one embodiment of the invention. Note that initiation queue 210, status queue 220 and user memory 250 all reside within shared memory 205, which may be allocated within RAM 135 of FIG. 1. I/O cache 280 is a store-thru cache for hard disk operations involving hard disk array 270. I/O cache 280 is said to be store-thru since every write request from OS 125 results in data being transferred from user memory 250 to I/O cache 280 and then to disk array 270 before the write request is given a status of complete.

I/O cache 280 is used to enhance the operation of computing system 100 in several ways. The speed of operation of logical I/O interface 115 is enhanced, since memory operations with high-speed cache memory reduces the amount of time required for read/write operations. In addition, read before write problems normally associated with hard disk arrays are solved when using a single interface to disk array 270. I/O cache 280 may be implemented as a single interface to disk array 270, so that read and write operations with disk array 270 do not happen concurrently. Additionally, I/O cache 280 provides a translation interface between data block sizes associated with disk array 270 and the data block sizes associated with operating system 125. A data block translation is required, for example, when partial record updates are required to disk array 270. Disk array 270 is, for example, a SCSI disk array that requires all write requests to have a minimum request size of one record. If a write request is made from OS 125 that is less than one record size of SCSI disk array 270, then I/O cache 280 is operative to perform the necessary data size translations required to meet the minimum record size requirements of SCSI disk array 270.

During I/O operations, operating system 125 inserts I/O request packets into initiation queue 210, which may be a result of I/O requests from user 180. I/O manager 230 is configured to poll initiation queue 210 for valid l/O requests from OS 125. When a valid request is found within initiation queue 210, a flag within the valid request is set indicating that the valid I/O request is being processed by logical I/O manager 230. I/O manager 230 reports any errors by writing the status into the appropriate status packet within status queue 220. OS 125 is configured to poll command queue 215 for I/O request completions and status updates found in status queue 220. If the I/O request is valid, I/O manager 230 calls the appropriate device handler 240 specified by the request type. The request type, for example, may be disk array 270 I/O requests.

If the I/O request is a disk array 270 read request, the disk array device handler (not shown) within device handler 240 first determines if the requested data is already contained within I/O cache 280. If the data exists within I/O cache 280, the data is simply formatted and transferred to OS 125. If the data is not in I/O cache 280, however, the disk array device handler must stage the data from disk array 270. The device handler builds the appropriate read command using either a SCSI or fiber channel, for example, and issues the command to disk array 270. Once the data is staged into I/O cache 280, the data is formatted and transferred to OS 125. Status is passed to I/O manager 230 and once the status is posted into status queue 220, control is returned to I/O manager 230.

If the I/O request is a disk array 270 write request, a disk array device handler (not shown) within device handler 240 builds the appropriate write command for the channel type (e.g. SCSI or Fiber) that disk array 270 is connected to. The command is then transmitted to disk array 270 and once control is returned to the disk array handler, the disk array handler builds any additional commands specified by the I/O request or returns status to I/O manager 230 for subsequent reporting to status queue 220. When the status has been posted, the disk array device handler returns control to I/O manager 230.

Once control has been passed back to I/O manager 230, I/O manager 230 once again polls the initiation queue for valid I/O requests. I/O manager may be configured to allow only a single I/O request to be processed for a given disk at a given time in order to guarantee valid data read and write operations. A single I/O cache 280 may also be used to avoid data coherency problems.

Figure 3:
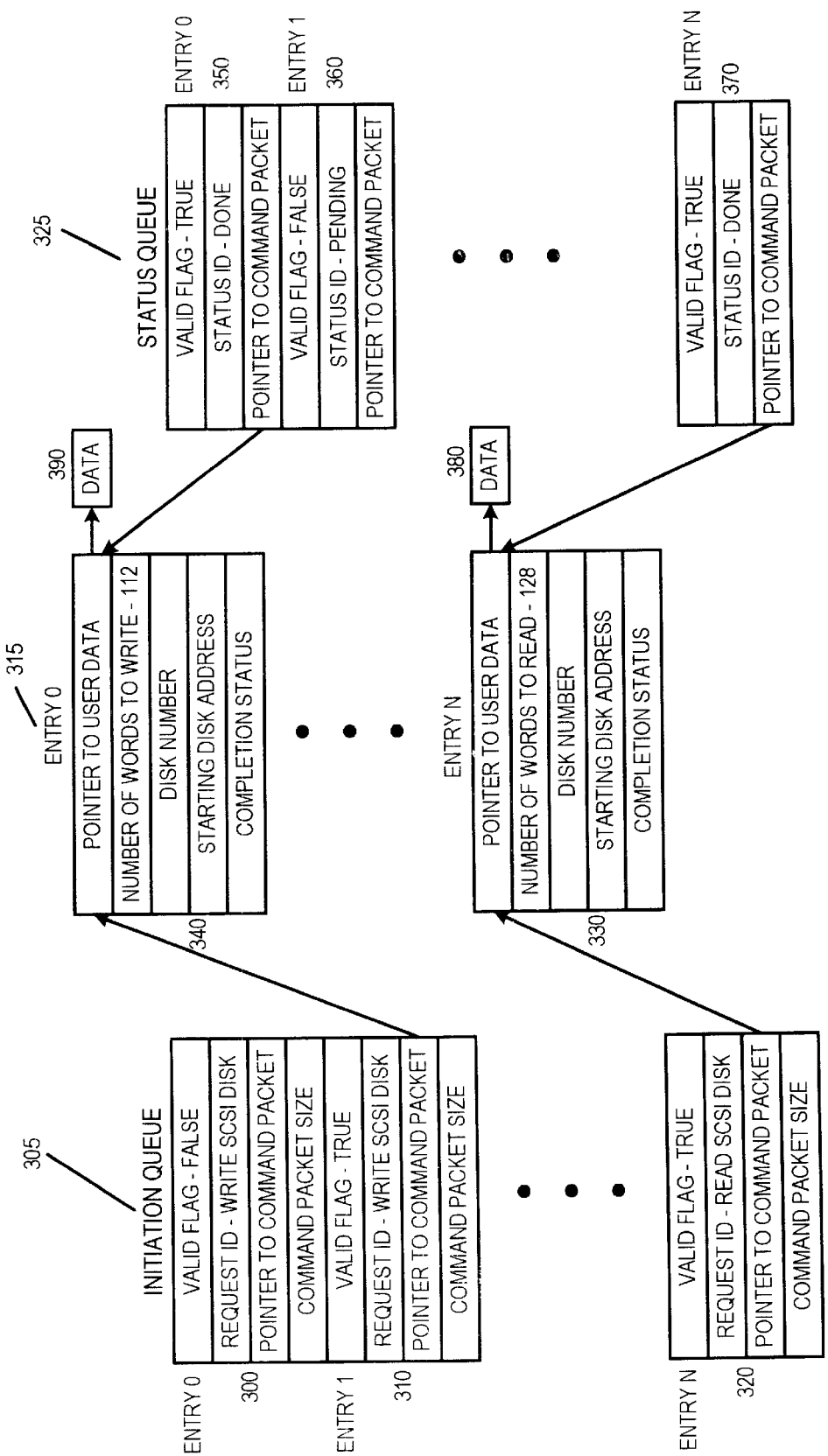
FIG. 3 illustrates initiation, command and status queues.

FIG. 3 illustrates initiation and status queue structures and the relationship between the initiation and status queues with the I/O requests. As discussed above, I/O requests may be processed from any number of sources, such as user 180, as shown in FIG. 1, or from operating system 125.

Initiation queue 305 exists in order to queue I/O requests for access to disk array 270, or any other device that may be connected to device handler 240. I/O requests are formatted into command queue 315 by operating system 125. Initiation packets and command packets extend from 1 to n and are uniquely bound to each other through the use of the "Pointer to Command Packet" entry within each initiation packet. For example, initiation packet 310 is bound to command-packet 340 and initiation packet 320 is bound to command packet 330. Similarly, status queue 325 and command queue 315 are uniquely bound to each other through the use of the "Pointer to Command Packet" entries in each status packet. For example, status packet 350 is bound to command packet 340 and status packet 370 is bound to command packet 330.

Initiation packet 300 represents a SCSI disk write request having no entry in the command queue, since initiation packet 300 has not been validated, which is reflected by the "False" value of the Valid Flag entry for initiation packet 300. Initiation packet 310 contains a SCSI Disk write request. The Valid Flag of initiation packet 310 has been set to "True" by I/O manager 230 of FIG. 2, which signifies that the write request has been validated by I/O manager 230. The write request is complete as verified by the "Done" value of the Status ID field of status packet 350. Data 390 contains user data from, for example, RAM 135 of FIG. 1 that is staged into I/O cache 280 of FIG. 2 for translation into the format required by disk array 270. Initiation packet 320 contains a SCSI drive read request. The Valid Flag of initiation packet 320 has been set to "True" by I/O manager 230 of FIG. 2, which signifies that the read request has been validated by I/O manager 230. The read request is complete as verified by the "Done" value of the Status ID field of status packet 370. Data 380 contains the requested data from disk array 270 of FIG. 2 that is to be de-staged from I/O cache 280 of FIG. 2, once translation from the disk array format to the operating system format is complete.

One advantage of I/O cache 280 of FIG. 2 is that I/O cache 280 translates data record length formats between operating system 125 and, for example, SCSI data formats required by disk array 270. Disk array data records for disk array 270, for example, may consist of 512 byte records each consisting of 128 words that are 32 bits wide. Operating system data records, however, may be comprised of byte counts of less than 512 bytes having word boundaries longer or shorter than 32 bits each. If operating system 125 used data record sizes of 504 bytes, for example, then an 8-byte pad is required as a filler for the OS data record to be compatible with the SCSI device data record, so that the data record boundaries are aligned at 512 bytes each.

OS 125 provides word lengths of, for example, 36 bits, or equivalently, 4.5 bytes per word, where a byte is equal to 8 bits. A data record length for OS 125 is 4032 bits, or equivalently, 112, 36 bit words. A data record size required by SCSI device 270, for example, requires a data record length of 4096 bits, or equivalently, 128, 32 bits words. A difference of 64 bits, therefore, exists between OS 125 data record sizes and the data records sizes required by SCSI device 270. A data record size translation is, therefore, required in order to align the two data record sizes. I/O cache 280 is used to stage read request or write request data for appropriate translation.

In the case of a disk array 270 write request, for example, a pad mechanism is required to pad the 504 byte data record into the required 512 byte data record as required by disk array 270. I/O cache 280, therefore, receives data 390 of FIG. 3, for example, bound for disk array 270 during a write request. 64, zero-valued bits are appended to the 504 byte OS 125 data record and subsequently written to disk array 270 via I/O cache 280 of FIG. 2. The data write sequence retrieves user data from user memory 250, stages the user data into I/O cache 280 for pad translation and finally updates disk array 270 with the translated data record. Once the data write sequence completes, device handler 240 reports to I/O manager 230 and I/O manager changes the status id field of status packet 350 to "Done". The "Done" status of the write request is then reflected in command packet 340 for subsequent access by OS 125. It can be seen, therefore, that the write request implements a store-thru I/O cache, such that a single write request is effective to synchronize user data 390, I/O cache 280 data and disk array 270 data prior to updating the write request status complete flag of command packet 350.

Conversely, in the case of a read request, a strip mechanism is required to strip the 512-byte data record from disk array 270 into the required 504-byte data record as required by OS 125. I/O cache 280, therefore, either already contains the requested data or must retrieve the requested data from disk array 270. Once the data exists within I/O cache 280, the trailing 64, zero-valued bits are stripped from the data record and subsequently stored as data 380 of FIG. 3, for example. The data read sequence either retrieves user data from disk array 270 or finds that the data is already staged in I/O cache 280, performs the strip translation from 512 bytes to 504 bytes and finally updates data 380 with the strip translated data record. Once the data read sequence completes, device handler 240 reports to I/O manager 230 and I/O manager changes the status id field of status packet 370 to "Done". The "Done" status of the write request is then reflected in command packet 330 for subsequent access by OS 125. It can be seen, therefore, that the read request implements transparent strip translation, such that the translated data record is completely transparent to user 180 of FIG. 1, for example. It should be noted that the pad/strip translations are easily modified to accommodate virtually any combination of record size translations that may be required.

Figure 4:
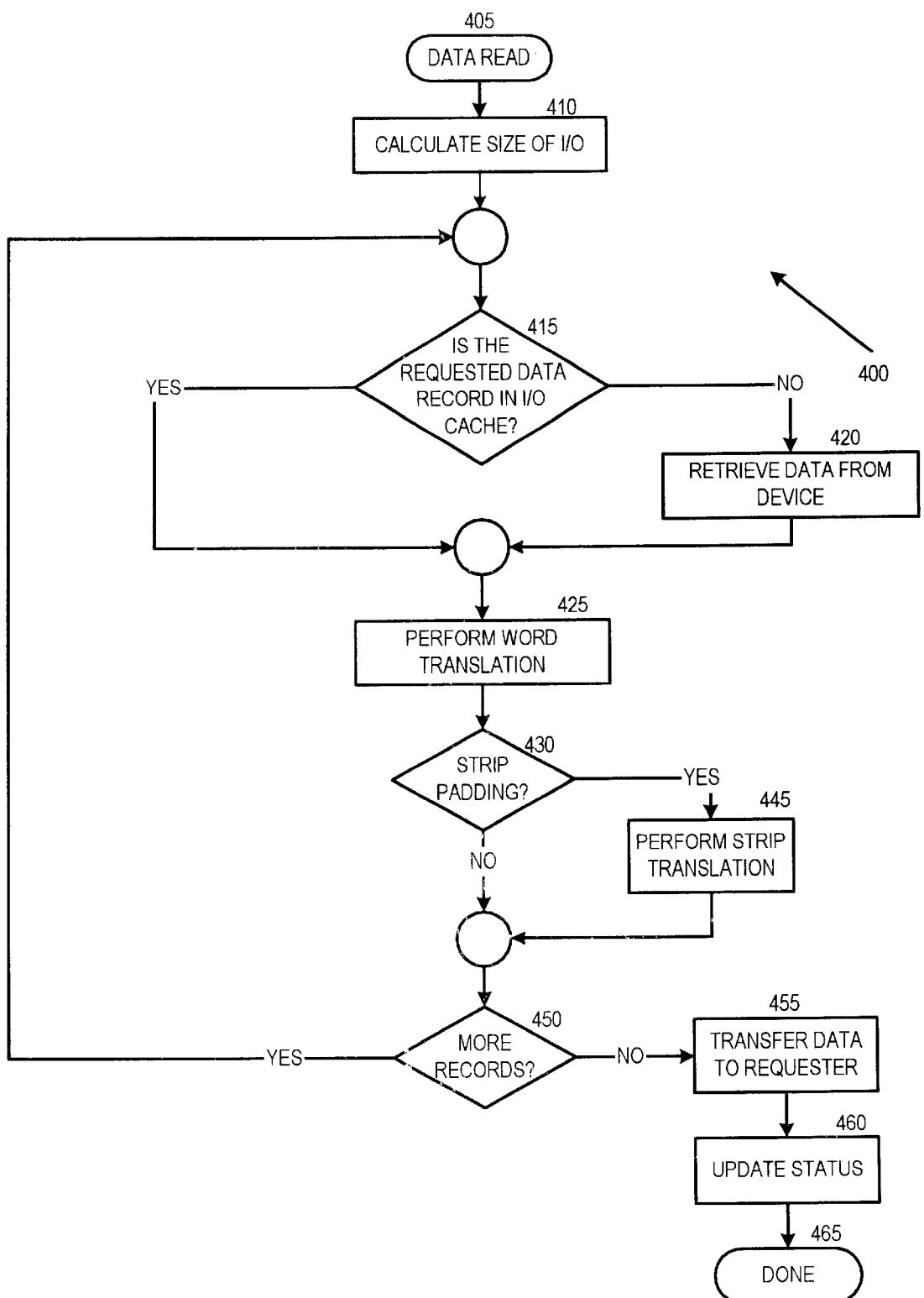
FIG. 4 illustrates a flow diagram of a read data request.

FIG. 4 illustrates an exemplary flow diagram of read request 400 according to an embodiment of the present invention. A read request issued by OS 125, for example, starts at 405. A calculation is performed at block 410 to establish the number of data records that are required by the read request. The number of data records required is a function of the data segment size and the size of the data record retrieved from disk array 270, for example. A data segment of 10,080 bytes required by OS 125, for example, requires a data segment of 10,240 bytes of data to be retrieved from disk array 270, since disk array 270 uses 512 byte data record boundaries. A total of 20 data records of 512 bytes each are retrieved for a data segment size of 10,240 bytes for a total of 128 words that are 32 bits wide. Block 415 determines whether the data retrieval is to be performed from disk array 270, or I/O cache 280, depending on whether the requested data has already been staged to I/O cache 280. If the data is already in I/O cache 280, then control transfers to block 425. Otherwise, a disk array read is performed at block 420. A word translation is performed at block 425 to convert each 32-bit word, for example, retrieved from I/O cache 280 to a 36-bit word required by OS 125, for example. A number of bytes equal to the difference between the data record size of disk array 270 and the data record size of the requestor, OS 125 for example, are optionally stripped from each data record in I/O cache 280 at block 445, if required by decision block 430. Once the data record has been retrieved and properly translated, block 450 determines if more data records are required and repeats the process at block 415 if required. Once no more data records are required, the entire data segment is transferred to the requester at block 455 and the read status is updated at block 460 and the process ends at block 465. It should be noted, that data record alignment through strip translation may not be necessary, depending upon the device that is interfaced to OS 125. The strip translation, therefore, is a configurable feature allowing a high degree of customization.

Figure 5:
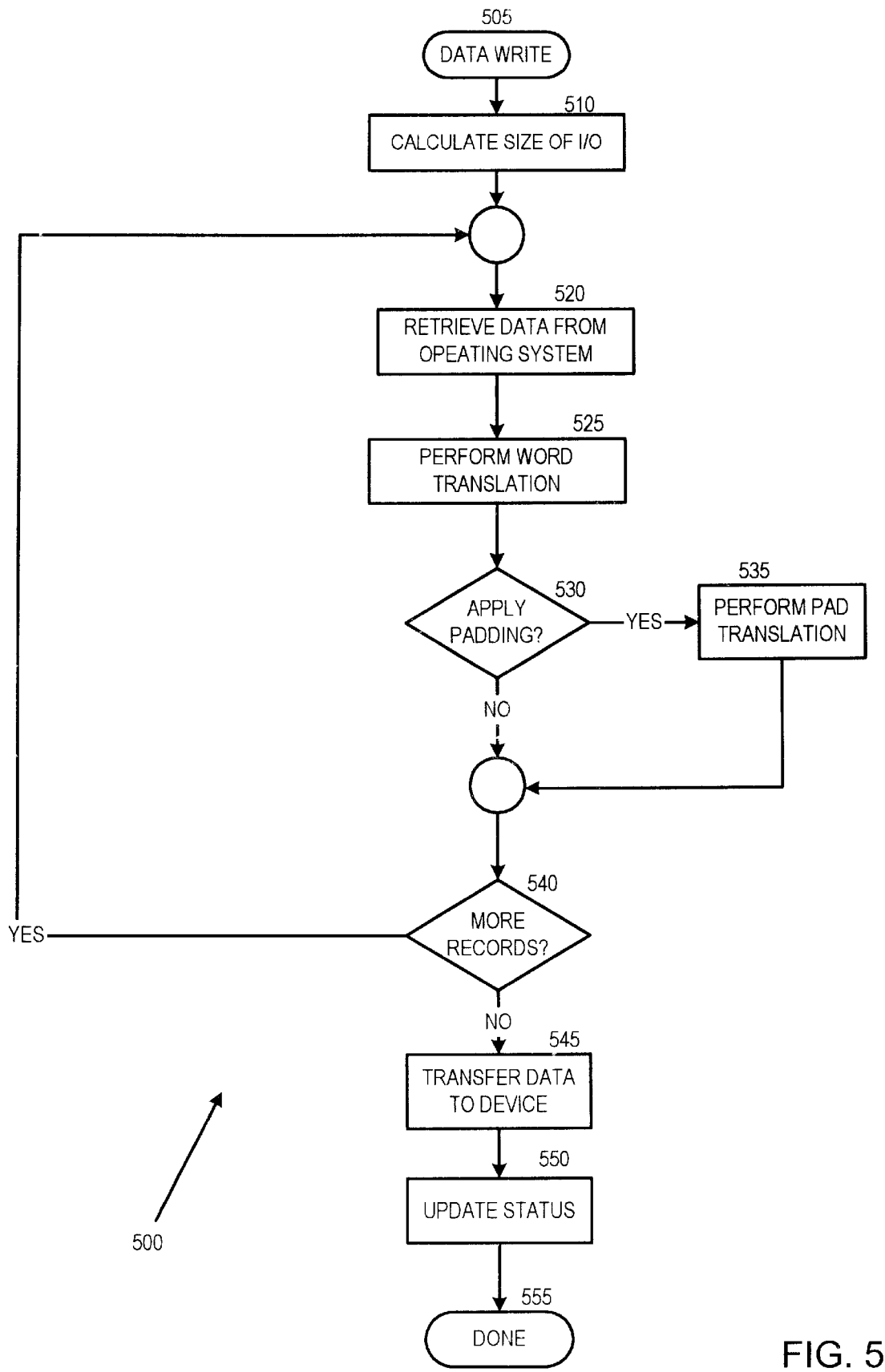
FIG. 5 illustrates a flow diagram of a write data request.

FIG. 5 illustrates an exemplary flow diagram of write request 500 according to an embodiment of the present invention. A write request issued by OS 125, for example, starting at block 505. A calculation of the number of data records required is performed at block 510 to establish the number of data records that are required by the write request. The number of data records required is a function of the size of the data segment received from OS 125, for example, and the size of the data record that is required by OS 125, for example. A data segment of 10,080 bytes received from OS 125 at block 520, for example, requires 20, 504 byte data records to be saved. Each word of each record is translated from the 36 bit format used by OS 125, for example, to the 32 bit word format used by disk array 270, for example, at block 525. Optionally, each data block from OS 125 has an 8-byte pad appended to the back end at block 535, for a total of 10,240 translated bytes of data to be saved, as a result of the decision at block 530. The pad translation is performed if the device receiving the data segment operates on a different data block boundary than OS 125. Block 540 determines if more data records are required and repeats the process starting at block 520. Once the entire data segment has been received, the data segment is saved to the device at block 545 and the write status is updated as being completed at block 550. The write request ending at block 555. It should be noted, that data record alignment through pad translation may not be necessary, depending upon the device that is interfaced to OS 125. The pad translation, therefore, is a configurable feature allowing a high degree of customization.

In summary, a novel system and method is presented to perform data record length alignments between systems having different data record lengths. External hardware has been eliminated as was used in the prior art and replaced with a high performance, I/O cache having great flexibility through its software control. Virtually any data block size is aligned using the I/O cache system discussed herein between virtually any operating system or device that may be required to interface to each other.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. In a computer system having an operating system defining the operation of the computer system, the computer system comprising:
   a first memory device containing the operating system, wherein the operating system defines a logical interface, the logical interface including:
      a first queue coupled to receive requests from the operating system;
      a second queue coupled to maintain a status of the requests received from the operating system; and
      a memory storage area coupled to provide storage for user data; and
   a second memory device coupled to the memory storage area to modify a block size of the user data, wherein the block size of the user data is configurable by the computer system.

2. The computer system of claim 1, wherein the second memory device is operative to provide bi-directional data processing between an external device and the memory storage area.

3. The computer system of claim 2, wherein the second memory device is configured to optionally modify the user data received from the memory storage area.

4. The computer system of claim 3, wherein the second memory device modifies the block size of the user data through a pad translation.

5. The computer system of claim 2, wherein the second memory device is configured to optionally modify data received from the external device.

6. The computer system of claim 5, wherein the second memory device modifies the block size of the data received from the external device through a strip translation.

7. The computer system of claim 2, wherein the second memory device is operative to maintain a synchronization between the external device and the memory storage area.

8. An article of manufacture comprising a program storage medium readable by a computer, the medium tangibly embodying one or more programs of instructions executable by the computer to perform a method of operating a computer system, the method comprising:
   receiving requests from the computer system to transfer data blocks between the computer system and an external system;
   allowing a configurable size for the data blocks; and
   translating the size of the data blocks exchanged between the computer system and the external system, wherein the size of the data blocks after translation align with each other.

9. The method of claim 8, wherein the received requests are queued in an initiation queue and managed by an I/O manager.

10. The method of claim 9, wherein actions taken in response to the received requests are statused by the I/O manager in a status queue.

11. The method of claim 8, wherein translating the size of the data blocks received from the computer system includes optionally padding the data blocks to a size compatible with a size required by the external system.

12. The method of claim 8, wherein translating the size of the data blocks received from the external system includes optionally stripping the data blocks to a size compatible with a size required by the computer system.

13. A method of operating a computer system, comprising:
   receiving requests from the computer system to transfer data blocks between the computer system and an external system;
   allowing a configurable size for the data blocks; and
   translating the size of the data blocks exchanged between the computer system and the external system, wherein the size of the data blocks after translation align with each other.

14. The method of claim 13, wherein the received requests are queued in an initiation queue and managed by an I/O manager.

15. The method of claim 14, wherein actions taken in response to the received requests are statused by the I/O manager in a status queue.

16. The method of claim 13, wherein translating the size of the data blocks received from the computer system includes optionally padding the data blocks to a size compatible with a size required by the external system.

17. The method of claim 13, wherein translating the size of the data blocks received from the external system includes optionally stripping the data blocks to a size compatible with a size required by the computer system.

18. A computer system comprising:
   a first memory means containing an operating system, wherein the operating system defines a logical interface, the logical interface including:
      a first queuing means coupled to receive requests from the operating system;
      a second queuing means coupled to maintain a status of the requests received from the operating system; and
      a memory storage means coupled to provide storage for user data; and
   a second memory means coupled to the memory storage means for modifying a block size of the user data, wherein the block size of the user data is configurable by the computer system.

19. The computer system of claim 18, wherein the second memory means is operative to provide bi-directional data processing between an external device and the memory storage means.

20. The computer system of claim 19, wherein the second memory means is configured to optionally modify the user data received from the memory storage means.

21. The computer system of claim 20, wherein the second memory means modifies the block size of the user data through a pad translation.

22. The computer system of claim 19, wherein the second memory means is configured to optionally modify data received from the external device.

23. The computer system of claim 22, wherein the second memory means modifies the block size of the data received from the external device through a strip translation.

24. The computer system of claim 19, wherein the second memory means is operative to maintain a synchronization between the external device and the memory storage means.

* * * * *